(12) United States Patent
Tang (10) Patent No.: US 11,057,905 B2
(45) Date of Patent: Jul. 6, 2021

(54) COMMUNICATION METHOD, NETWORK DEVICE AND TERMINAL DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 39 days.

(21) Appl. No.: 16/096,268

(22) PCT Filed: May 13, 2016

(86) PCT No.: PCT/CN2016/082103
§ 371 (c)(1),
(2) Date: Oct. 24, 2018

(87) PCT Pub. No.: WO2017/193392
PCT Pub. Date: Nov. 16, 2017

(65) Prior Publication Data
US 2019/0150162 A1 May 16, 2019

(51) Int. Cl.
*H04W 72/10* (2009.01)
*H04W 72/08* (2009.01)
(Continued)

(52) U.S. Cl.
CPC ............ *H04W 72/10* (2013.01); *H04W 8/20* (2013.01); *H04W 72/06* (2013.01); *H04W 72/08* (2013.01);
(Continued)

(58) Field of Classification Search
CPC ... H04W 72/10; H04W 72/044; H04W 72/06; H04W 72/08; H04W 28/0268; H04L 5/0064; H04L 41/0896; H04L 41/147
See application file for complete search history.

(56) References Cited

U.S. PATENT DOCUMENTS 6,169,898 B1 1/2001 Hsu
7,155,215 B1 12/2006 Miernik
(Continued)

FOREIGN PATENT DOCUMENTS

CN 1882171 A 12/2006
CN 101350787 A 1/2009
(Continued)

OTHER PUBLICATIONS

Supplementary European Search Report and search opinion in European application No. 16901347.1, dated Jan. 28, 2019.
(Continued)

*Primary Examiner* — Elton Williams
(74) *Attorney, Agent, or Firm* — Ladas & Parry, LLP (57) ABSTRACT

Provided are a communication method, a network device and a terminal device. The method comprises: a network device obtains signature information of a terminal device, the signature information comprising level information of the terminal device; the network device allocates a first network configuration for the terminal device according to the level information; the network device sends the first network configuration to the terminal device, so that the terminal device communicates with the network device according to the first network configuration. The network device obtains the signature information comprising the level information of the terminal device and sends the network configuration allocated for the terminal device according to the level information to the terminal device, thereby enabling the network device to perform differenti-
(Continued)

ated network configuration for different terminal devices, thus improving the quality of service provided to high-level terminal devices.

11 Claims, 3 Drawing Sheets

(51) Int. Cl.
　　*H04W 8/20* 　　(2009.01)
　　*H04W 72/06* 　　(2009.01)
　　*H04W 80/02* 　　(2009.01)
　　*H04W 80/08* 　　(2009.01)
　　*H04W 88/02* 　　(2009.01)

(52) U.S. Cl.
　　CPC .......... *H04W 80/02* (2013.01); *H04W 80/08* (2013.01); *H04W 88/02* (2013.01)

(56) References Cited

U.S. PATENT DOCUMENTS

| | | | |
|---|---|---|---|
| 2007/0049285 A1 | 3/2007 | Miernik | |
| 2011/0249586 A1* | 10/2011 | Stanwood | H04W 72/042 370/252 |
| 2013/0159494 A1* | 6/2013 | Danda | H04L 41/5067 709/224 |
| 2014/0229210 A1 | 8/2014 | Sharifian et al. | |

FOREIGN PATENT DOCUMENTS

| | | |
|---|---|---|
| CN | 102448177 A | 5/2012 |
| CN | 102685816 A | 9/2012 |
| EP | 0973352 A2 | 1/2000 |
| JP | 2002300643 A | 10/2002 |
| JP | 2014236354 A | 12/2014 |
| JP | 2016502291 A | 1/2016 |
| WO | 2014127280 A2 | 8/2014 |
| WO | 2015172088 A1 | 11/2015 |

OTHER PUBLICATIONS

Written Opinion of the International Search Authority with English translation from WIPO in international application No. PCT/CN2016/082103, dated Dec. 29, 2016.
International Preliminary Report on Patentability with English translation from WIPO in international application No. PCT/CN2016/082103, dated Nov. 13, 2018.
First Office Action of the Japanese application No. 2018-553910, dated Jan. 7, 2020.
International Search Report in international application No. PCT/CN2016/082103, dated Dec. 29, 2016.
Written Opinion of the International Search Authority in international application No. PCT/CN2016/082103, dated Dec. 29, 2016.
First Office Action of the European application No. 16901347.1, dated Apr. 3, 2020.
3GPP TS 36.331 V13.1.0, Apr. 1, 2016, pp. 97-99,219-224,308-316,318-323,340-348, URL, http://www.3gpp.org/ftp/Specs/archive/36_series/36.331/36331-d10.zip.
First Office Action of the Indian application No. 201817037771, dated Jun. 11, 2020.
Second Office Action of the Japanese application No. 2018-553910, dated Apr. 10, 2020.
"3rd Generation Partnership Project; Technical Specification Group Services and System Aspects; General Packet Radio Service (GPRS) enhancements for Evolved Universal Terrestrial Radio Access Network (E-UTRAN) access (Release 13)" 3GPP TS 23.401 V13.5.0 (Dec. 2015), http://www.3gpp.org.
First Office Action of the Taiwanese application No. 106115189, dated Jan. 8, 2021.
Second Office Action of the European application No. 16901347.1, dated Apr. 7, 2021.

* cited by examiner

COMMUNICATION METHOD, NETWORK DEVICE AND TERMINAL DEVICE

CROSS-REFERENCE TO RELATED APPLICATION

The present application is the U.S. national phase of PCT Application PCT/CN2016/082103 filed on May 13, 2016, entitled "COMMUNICATION METHOD, NETWORK DEVICE AND TERMINAL DEVICE", the disclosure of which is hereby incorporated by reference in its entirety.

TECHNICAL FIELD

Embodiments of the application relate to communications, and more particularly to a communication method, network equipment and terminal equipment.

BACKGROUND

During network operation, an operator company may classify one or more terminal equipment based on an operation strategy or the like. For example, the ranking of terminal equipment includes gold, silver and copper. Terminal equipment may learn ranking information when subscribing a network, and meanwhile, subscription information of the terminal equipment may also be stored in core network equipment.

In a related system, an access network entity, when allocating a radio resource for terminal equipment, may consider Quality of Service (QoS) of a service initiated by the terminal equipment, a wireless channel condition of the terminal equipment, a load condition of a network or the like. However, a Radio Access Network (RAN) does not actually consider subscription information of terminal equipment, particularly a ranking of the terminal equipment, so that terminal equipment with high ranking may not enjoy high-quality service.

SUMMARY

The embodiments of the application provide a communication method, which may improve QoS provided for high-ranking terminal equipment.

A first aspect provides a communication method. Network equipment acquires subscription information, the subscription information including ranking information of terminal equipment. The network equipment allocates a first network configuration for the terminal equipment according to the ranking information. The network equipment sends the first network configuration to the terminal equipment to enable the terminal equipment to communicate with the network equipment according to the first network configuration.

The network equipment acquires the subscription information including the ranking information of the terminal equipment and determines the network configuration for the terminal equipment according to the ranking information. In such a manner, the network equipment may provide differentiated network configurations for different terminal equipment, thereby improving QoS provided for high-ranking terminal equipment.

In combination with the first aspect, in a first possible implementation mode of the first aspect, the operation that the network equipment acquires the subscription information of the terminal equipment may include that the network equipment acquires the subscription information from core network equipment or the terminal equipment.

In combination with the first aspect or the first possible implementation mode of the first aspect, in a second possible implementation mode of the first aspect, the first network configuration may include at least one of a physical configuration, a Media Access Control (MAC) configuration, a Radio Link Control (RLC) configuration, a Packet Data Convergence Protocol (PDCP) configuration or a time-frequency resource configuration.

In combination with the first aspect and any possible implementation mode in the first possible implementation mode of the first aspect and the second possible implementation mode of the first aspect, in a third possible implementation mode of the first aspect, the ranking information may be configured to indicate that the terminal equipment is first-priority terminal equipment, second-priority terminal equipment or third-priority terminal equipment. The first-priority terminal equipment, the second-priority terminal equipment and the third-priority terminal equipment have gradually-decreased priorities.

In combination with the third possible implementation mode of the first aspect, in a fourth possible implementation mode of the first aspect, the operation that the network equipment allocates the first network configuration for the terminal equipment according to the ranking information may include that, if the ranking information indicates that the terminal equipment is the first-priority terminal equipment, the network equipment preferentially allocates the first network configuration for the first-priority terminal equipment.

In combination with the third possible implementation mode of the first aspect, in a fifth possible implementation mode of the first aspect, the operation that the network equipment allocates the network configuration for the terminal equipment according to the ranking information may include that, if the ranking information indicates that the terminal equipment is the first-priority terminal equipment, the network equipment determines a second network configuration, the second network configuration being a network configuration with a highest utilization rate in all network configurations allocated for the first-priority terminal equipment by the network equipment; and the network equipment preferentially allocates the second network configuration for the first-priority terminal equipment.

A second aspect provides a communication method. Terminal equipment receives a network configuration sent by network equipment, the network configuration being determined by the network equipment according to ranking information of the terminal equipment in subscription information. The terminal equipment communicates with the network equipment according to the network configuration.

The terminal equipment receives the network configuration determined by the network equipment according to the ranking information of the terminal equipment and communicates with the network equipment. In such a manner, different terminal equipment may obtain differentiated network configurations, thereby improving QoS enjoyed by high-ranking terminal equipment.

In combination with the second aspect, in a first possible implementation mode of the second aspect, the network configuration may include at least one of a physical configuration, a MAC configuration, an RLC configuration, a PDCP configuration or a time-frequency resource configuration.

In combination with the second aspect or the first possible implementation mode of the second aspect, in a second possible implementation mode of the second aspect, the ranking information may be configured to indicate that the terminal equipment is first-priority terminal equipment, second-priority terminal equipment or third-priority terminal equipment. The first-priority terminal equipment, the second-priority terminal equipment and the third-priority terminal equipment have gradually-decreased priorities.

A third aspect provides a communication method. Terminal equipment receives a network configuration sent by network equipment. The terminal equipment determines subscription information, the subscription information including ranking information of the terminal equipment. The terminal equipment corrects the network configuration according to the ranking information. The terminal equipment communicates with the network equipment according to the corrected network configuration.

In the application, the terminal equipment corrects the network configuration received from the network equipment according to the ranking information in the subscription information and communicates with the network equipment according to the corrected network configuration. In such a manner, different terminal equipment may obtain differentiated network configurations, so that QoS provided for high-ranking terminal equipment is improved.

In combination with the third aspect, in a first possible implementation mode of the third aspect, the network configuration may include at least one of a physical configuration, a MAC configuration, an RLC configuration, a PDCP configuration or a time-frequency resource configuration.

In combination with the third aspect or the first possible implementation mode of the third aspect, in a second possible implementation mode of the third aspect, the ranking information may be configured to indicate that the terminal equipment is first-priority terminal equipment, second-priority terminal equipment or third-priority terminal equipment. The first-priority terminal equipment, the second-priority terminal equipment and the third-priority terminal equipment have gradually-decreased priorities.

In combination with the third aspect and any possible implementation mode in the first possible implementation mode of the third aspect and the second possible implementation mode of the third aspect, in a third possible implementation mode of the third aspect, the operation that the terminal equipment receives the network configuration sent by the network equipment may include that the terminal equipment receives the network configuration sent by the network equipment through a broadcast or dedicated high-layer signaling.

In combination with the third aspect and any possible implementation mode in the first possible implementation mode of the third aspect, the second possible implementation mode of the third aspect and the third possible implementation mode of the third aspect, in a fourth possible implementation mode of the third aspect, the network configuration may be a service of a first rate. The operation that the terminal equipment corrects the network configuration according to the ranking information may include that, if the ranking information indicates that the terminal equipment is the first-priority terminal equipment, the first-priority terminal equipment offsets the first rate into a second rate, the second rate being higher than the first rate.

In combination with the third aspect and any possible implementation mode in the first possible implementation mode of the third aspect, the second possible implementation mode of the third aspect and the third possible implementation mode of the third aspect, in a fifth possible implementation mode of the third aspect, the network configuration may be a residence rate or access rate of a first percentage, the residence rate may be a probability of residence of the terminal equipment in a present network in case of network congestion, and the access rate may be a probability of accessing the terminal equipment to the network equipment. The operation that the terminal equipment corrects the network configuration according to the ranking information may include that, if the ranking information indicates that the terminal equipment is the first-priority terminal equipment, the first-priority terminal equipment amplifies the residence rate or the access rate into a second percentage, the second percentage being higher than the first percentage.

A fourth aspect provides a communication method. Network equipment allocates a network configuration for terminal equipment. The network equipment sends the network configuration to the terminal equipment to enable the terminal equipment to correct the network configuration according to ranking information in subscription information and communicate with the network equipment through the corrected network configuration.

In the application, the network equipment allocates the network configuration for the terminal equipment and sends the network configuration to the terminal equipment to enable the terminal equipment to correct the network configuration received from the network equipment according to the ranking information in the subscription information and to communicate with the network equipment according to the corrected network configuration. In such a manner, different terminal equipment may obtain differentiated network configurations, so that QoS provided for high-ranking terminal equipment is improved.

In combination with the fourth aspect, in a first possible implementation mode of the fourth aspect, the network configuration may include at least one of a physical configuration, a MAC configuration, an RLC configuration, a PDCP configuration or a time-frequency resource configuration.

In combination with the fourth aspect or the first possible implementation mode of the fourth aspect, in a second possible implementation mode of the fourth aspect, the ranking information may be configured to indicate that the terminal equipment is first-priority terminal equipment, second-priority terminal equipment or third-priority terminal equipment. The first-priority terminal equipment, the second-priority terminal equipment and the third-priority terminal equipment have gradually-decreased parameter requirements on the network configuration.

A fifth aspect provides network equipment, which includes each of modules for executing the method in the first aspect or any possible implementation mode of the first aspect.

A sixth aspect provides terminal equipment, which includes each module executing the method in the second aspect or any possible implementation mode of the second aspect.

A seventh aspect provides terminal equipment, which includes each of modules for executing the method in the third aspect or any possible implementation mode of the third aspect.

An eighth aspect provides network equipment, which includes each of modules for executing the method in the fourth aspect or any possible implementation mode of the fourth aspect.

A ninth aspect provides a communication system, which includes the network equipment of the fifth aspect and the terminal equipment of the sixth aspect.

A tenth aspect provides a communication system, which includes the terminal equipment of the seventh aspect and the network equipment of the eighth aspect.

An eleventh aspect provides network equipment, which includes a processor and a memory. The memory stores a program, and the processor executes the program to execute the communication method in the first aspect or any possible implementation mode of the first aspect.

A twelfth aspect provides terminal equipment, which includes a processor and a memory. The memory stores a program, and the processor executes the program to execute the communication method in the second aspect or any possible implementation mode of the second aspect.

A thirteenth aspect provides terminal equipment, which includes a processor and a memory. The memory stores a program, and the processor executes the program to execute the communication method in the third aspect or any possible implementation mode of the third aspect.

A fourteenth aspect provides terminal equipment, which includes a processor and a memory. The memory stores a program, and the processor executes the program to execute the communication method in the fourth aspect or any possible implementation mode of the fourth aspect.

A fifteenth aspect provides a computer storage medium, in which a program code is stored, the program code being configured to indicate the communication method in the first aspect or any possible implementation mode of the first aspect to be executed.

A sixteenth aspect provides a computer storage medium, in which a program code is stored, the program code being configured to indicate the communication method in the second aspect or any possible implementation mode of the second aspect to be executed.

A seventeenth aspect provides a computer storage medium, in which a program code is stored, the program code being configured to indicate the communication method in the third aspect or any possible implementation mode of the third aspect to be executed.

An eighteenth aspect provides a computer storage medium, in which a program code is stored, the program code being configured to indicate the communication method in the fourth aspect or any possible implementation mode of the fourth aspect to be executed.

Based on the foregoing technical solutions, according to the communication method, network equipment and terminal equipment in the embodiments of the application, the network equipment acquires the subscription information including the ranking information of the terminal equipment and allocates the network configuration for the terminal equipment. In such a manner, the network equipment may provide differentiated network configurations for different terminal equipment, so that QoS provided for high-ranking terminal equipment is improved.

BRIEF DESCRIPTION OF DRAWINGS

In order to describe the technical solutions of the embodiments of the application more clearly, the drawings required to be used in descriptions about the embodiments or a conventional art will be simply introduced below. It is apparent that the drawings described below are only some embodiments of the application. Other drawings may further be obtained by those of ordinary skill in the art according to these drawings without creative work.

DETAILED DESCRIPTION

The technical solutions in the embodiments of the application will be clearly and completely described below in combination with the drawings in the embodiments of the application. It is apparent that the described embodiments are not all embodiments but part of embodiments of the application. All other embodiments obtained by those of ordinary skill in the art on the basis of the embodiments in the application without creative work shall fall within the scope of protection of the application.

Each of embodiments of terminal equipment and network equipment is combined in the application. The terminal equipment may also be called an access terminal, a user unit, a user station, a mobile radio station, a mobile station, a remote station, a remote terminal, mobile equipment, a user terminal, a terminal, wireless communication equipment, a user agent or a user device. The access terminal may be a cell phone, a cordless phone, a Session Initiation Protocol (SIP) phone, a Wireless Local Loop (WLL) station, a Personal Digital Assistant (PDA), handheld equipment with a wireless communication function, computing equipment, other processing equipment connected to a wireless modem, vehicle-mounted equipment, wearable equipment and terminal equipment in a future 5th-Generation (5G) network.

The network equipment may be configured to communicate with mobile equipment, and the network equipment may be a Base Transceiver Station (BTS) in a Global System of Mobile communication (GSM) or Code Division Multiple Access (CDMA), may also be a NodeB (NB) in Wideband Code Division Multiple Access (WCDMA), and may further be an Evolutional Node B (eNB or eNodeB) in Long Term Evolution (LTE), or a relay station or an access point, or vehicle-mounted equipment, wearable equipment and network equipment in the future 5G network.

Core network equipment may be a Mobility Management Entity (MME) and may also be a Serving Gateway (S-GW) or a Packet Data Network Gateway (P-GW), which is not limited in the application. For convenient description, descriptions will be made in the following embodiments with the MME as an example. However, the application is not limited thereto.

Figure 1:
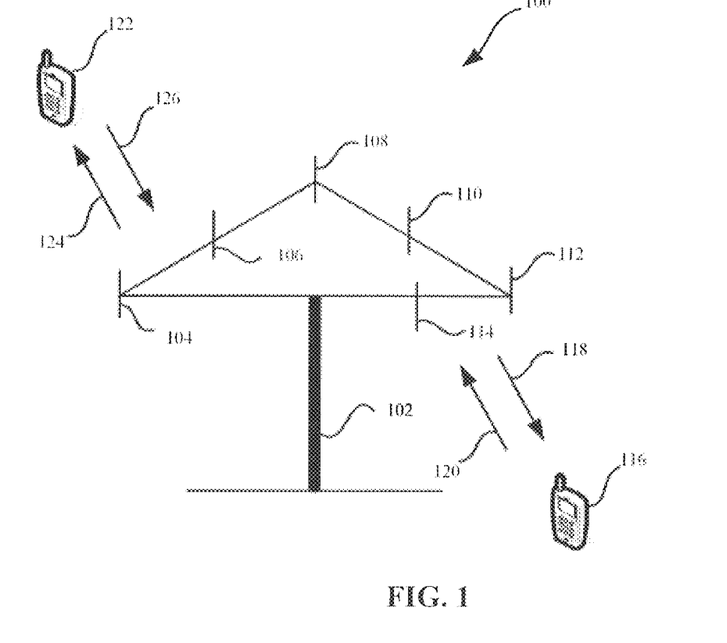
FIG. 1 is a diagram of an application scenario according to an embodiment of the application.

FIG. 1 is a schematic diagram of a communication system to which the embodiments of the application are applied. As shown in FIG. 1, the communication system 100 includes network equipment 102, and the network equipment 102 may include multiple antenna groups. Each of the antenna groups may include one or more antennas. For example, an antenna group may include antennas 104 and 106, another antennas group may include antennae 108 and 110, and an additional group may include antennas 112 and 114. FIG. 1 shows that each of the antenna groups includes two antennas. However, more or fewer antennas may be used for each of the groups. The network equipment 102 may additionally include a sender chain and a receiver chain. Those of ordinary skill in the art may understand that each of them may include multiple components (for example, a processor, a modulator, a multiplexer, a demodulator, a demultiplexer or an antenna) related to signal sending and receiving.

The network equipment 102 may communicate with multiple terminal equipment (for example, the terminal equipment 116 and the terminal equipment 122). However, it can be understood that the network equipment 102 may communicate with any number of terminal equipment like the terminal equipment 116 or 122. The terminal equipment 116 and 122 may be, for example, cell phones, smart phones, portable computers, handheld communication equipment, handheld computing equipment, satellite radio devices, global positioning systems, PDAs and/or any other suitable equipment configured for communication in the wireless communication system 100.

As shown in FIG. 1, the terminal equipment 116 communicates with the antennas 112 and 114. The antennas 112 and 114 send information to the terminal equipment 116 through a forward link 118 and receive information from the terminal equipment 116 through a reverse link 120. In addition, the terminal equipment 122 communicates with the antennas 104 and 106. The antennas 104 and 106 send information to the terminal equipment 122 through a forward link 124 and receive information from the terminal equipment 122 through a reverse link 126.

For example, in a Frequency Division Duplex (FDD) system, for example, the forward link 118 may use a frequency band different from that used by the reverse link 120, and the forward link 124 may use a frequency band different from that used by the reverse link 126.

For another example, in a Time Division Duplex (TDD) system and a full duplex system, the forward link 118 and the reverse link 120 may use the same frequency band, and the forward link 124 and the reverse link 126 may use the same frequency band.

Each of antenna groups and/or regions designed for communication may be called a sector of the network equipment 102. For example, the antenna group may be designed to communicate with terminal equipment in a sector of a coverage area of the network equipment 102. In a process that the network equipment 102 communicates with the terminal equipment 116 and 122 through the forward links 118 and 124 respectively, a sending antenna of the network equipment 102 may use beamforming to improve signal noise ratios of the forward links 118 and 124. In addition, compared with that the network equipment sends signals to all its terminal equipment through a single antenna, when the network equipment 102 sends signals to the terminal equipment 116 and 122 randomly scattered in the related coverage area by use of beamforming, mobile equipment in an adjacent cell may be interfered less.

In a given time, the network equipment 102, the terminal equipment 116 or the terminal equipment 122 may be a wireless communication sending device and/or a wireless communication receiving device. When data is sent, the wireless communication sending device may code the data for transmission. Specifically, the wireless communication sending device may acquire (for example, generation, receiving from another communication device or storage in a memory) a certain number of data bits to be sent to the wireless communication receiving device through a channel. The data bits may be included in a transmission block (or multiple transmission blocks) of the data, and the transmission block may be segmented to generate multiple code blocks.

The communication system in the application scenario of the present application has been described above in combination with FIG. 1 in detail, a communication method and communication equipment applied to the system will be described below in detail.

Figure 2:
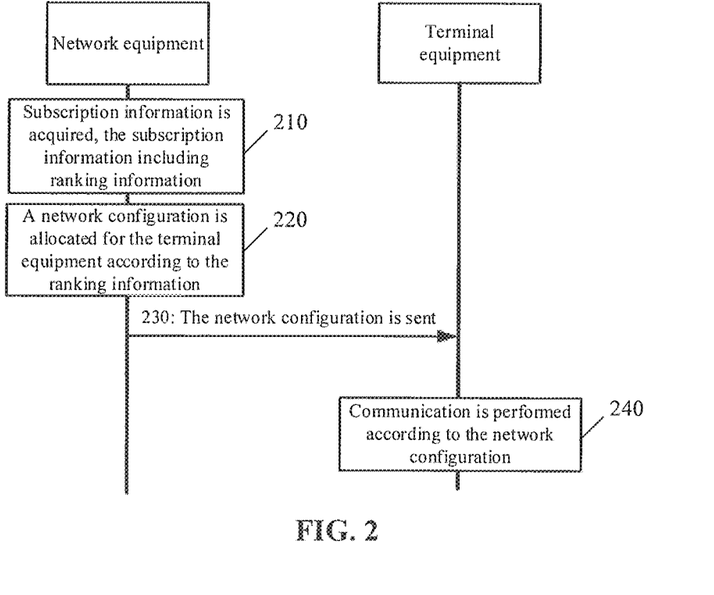
FIG. 2 is a schematic flowchart of a communication method according to an embodiment of the application.

FIG. 2 is a flowchart of a communication method according to an embodiment of the application. It is to be noted that this is not intended to limit the scope of the embodiments of the application but only to help those skilled in the art to better understand the embodiments of the application.

In 210, network equipment acquires subscription information of terminal equipment, the subscription information including ranking information of the terminal equipment;

Here, the ranking information of the terminal equipment may be configured to indicate that the terminal equipment is terminal equipment of gold, silver and copper rankings. Alternatively, the ranking information is configured to indicate that the terminal equipment is high-priority, medium-priority and low-priority terminal equipment. The ranking information may be also configured to indicate the specific number of rankings into which the terminal equipment may be divided or the like. There are no limits made in the application.

In an example, the operation that the network equipment acquires the subscription information of the terminal equipment includes that the network equipment acquires the subscription information from core network equipment or the terminal equipment.

Specifically, the network equipment may acquire the subscription information from the core network equipment. When establishing a link between a wireless network entity and a core network entity for the terminal equipment, a core network notifies the network equipment of the subscription information. For example, when the link between the wireless network entity and the core network entity is established for the terminal equipment, the subscription information is contained in a first message and/or third message sent to the network equipment by the terminal equipment or through another message. There are no limits made in the embodiment of the application.

The network equipment may also directly acquire the subscription information from the terminal equipment. For example, the terminal contains the subscription information in a Radio Resource Control (RRC) connection request message and/or RRC bearer establishment completion message sent to the network equipment or through another message. There are no limits made in the embodiment of the application.

In 220, the network equipment determines a network configuration according to the ranking information.

In the embodiment of the application, descriptions are made with the condition that the ranking information of the terminal equipment indicates that the terminal equipment has a high/medium/low priority as an example. However, the application is not limited.

In an example, the operation that the network equipment allocates a first network configuration for the terminal equipment according to the ranking information includes that: if the ranking information indicates that the terminal equipment is first-priority terminal equipment, the network equipment preferentially allocates the first network configuration for the first-priority terminal equipment.

If the terminal equipment is high-priority terminal equipment (i.e., the first-priority terminal equipment), the network equipment, when allocating radio resources, may preferentially allocate a network configuration for the high-priority terminal equipment. For example, in case of network congestion, the network equipment sequences the high-priority terminal equipment in the front of a queue, thereby preferentially scheduling a network resource.

In an example, the operation that the network equipment allocates the network configuration for the terminal equipment according to the ranking information includes that: if the ranking information indicates that the terminal equipment is the first-priority terminal equipment, the network equipment determines a second network configuration, the second network configuration being a network configuration with a highest utilization rate in all network configurations allocated for the first-priority terminal equipment by the network equipment; and the network equipment preferentially allocates the second network configuration for the first-priority terminal equipment.

The network equipment may also record historical information of each terminal equipment, determine a network configuration used by the terminal equipment for most times as a habitual setting (i.e., the second network configuration) of the terminal equipment according to all recorded network configurations allocated for the first-priority terminal equipment and further reasonably perform network configuration according to the habitual setting of the terminal equipment. For example, if the ranking information indicates that the terminal equipment is high-priority terminal equipment, a using habit of the high-priority terminal equipment, for example, whether the high-priority terminal equipment preferentially uses a Wireless Local Area Network (WLAN) or a cellular network, is determined according to the historical information. If the high-priority terminal equipment is used to using the WLAN, the network equipment preferentially allocates the WLAN for the high-priority terminal equipment. For the other terminal equipment of which ranking os lower than the high-priority terminal equipment, left network configurations are adopted and even the low-ranking cellular network may be allocated.

For the terminal equipment, if the network equipment determines that the terminal equipment preferentially uses the WLAN, even though the terminal equipment is using the cellular network, the terminal equipment is switched from the cellular network to the WLAN because the network equipment preferentially allocates a WLAN configuration for the terminal equipment. Similarly, if the network equipment determines that the terminal preferentially uses the cellular network, the terminal equipment may not be switched to the WLAN or low-priority terminal equipment is switched into the WLAN.

It is to be noted that networks may also be divided into different rankings. If a high-priority network or frequency point is congested, the network equipment may also allocate a network configuration of a high-ranking network for the high-priority terminal equipment. Correspondingly, a network configuration of a low-priority network or frequency point may be allocated for the low-priority terminal equipment.

In an example, the network configuration includes at least one of a physical configuration, a MAC configuration, an RLC configuration, a PDCP configuration or a time-frequency resource configuration.

Specifically, the network equipment determines one configuration of a layer-1 (physical layer) or layer-2 (MAC layer, RLC layer and PDCP layer) configuration or the time-frequency resource configuration according to the ranking information. Alternatively, the network equipment may simultaneously determine the layer-1, layer-2 and time-frequency resource configurations or the like according to the ranking information of the terminal equipment. Layer 1 includes a physical process of coding, modulation, multi-antenna mapping or the like and is configured to provide a transmission channel for the MAC layer. Layer 2 includes hybrid automatic repeat request, uplink and downlink scheduling or the like and is configured to provide a logical channel for the RLC layer.

It is to be noted that the network configuration may also be a location configuration of a physical time-frequency resource block, a modulation and coding configuration, a reference signal configuration, antenna configuration information, a transmission bandwidth or the like, which will not be listed herein one by one. There are no limits made in the application.

In 230, the network equipment sends the network configuration to the terminal equipment to enable the terminal equipment to communicate with the network equipment according to the network configuration.

In the embodiment of the application, the network equipment may send the network configuration to the terminal equipment through a system information broadcast. Alternatively, the network equipment may send the network configuration to the terminal equipment through control signaling. The control signaling may be physical control signaling, for example, a Physical Downlink Control Channel (PDCCH). Alternatively, the network equipment may further send the network equipment to the terminal equipment through dedicated high-layer signaling, which will not be limited in the application. In such a manner, the terminal equipment may communicate with the network equipment after receiving the network configuration.

In 240, the terminal equipment communicates with the network equipment according to the network configuration.

The terminal equipment communicates with the network equipment according to the network configuration determined by the network equipment according to the ranking information. The network equipment may provide differentiated network configurations for different terminal equipment, so that QoS enjoyed by the high-ranking terminal equipment is improved.

Therefore, according to the communication method in the embodiment of the application, the network equipment acquires the subscription information including the ranking information of the terminal equipment and allocates the network configuration for the terminal equipment according to the ranking information. In such a manner, the network equipment may provide differentiated network configurations for different terminal equipment. Therefore, the QoS provided for the high-ranking terminal equipment is improved.

It is to be understood that, in various embodiments of the application, a sequence number of each process does not mean an execution sequence and the execution sequence of each process should be determined by its function and an internal logic and should not form any limit to an implementation process of the embodiments of the application.

Figure 3:
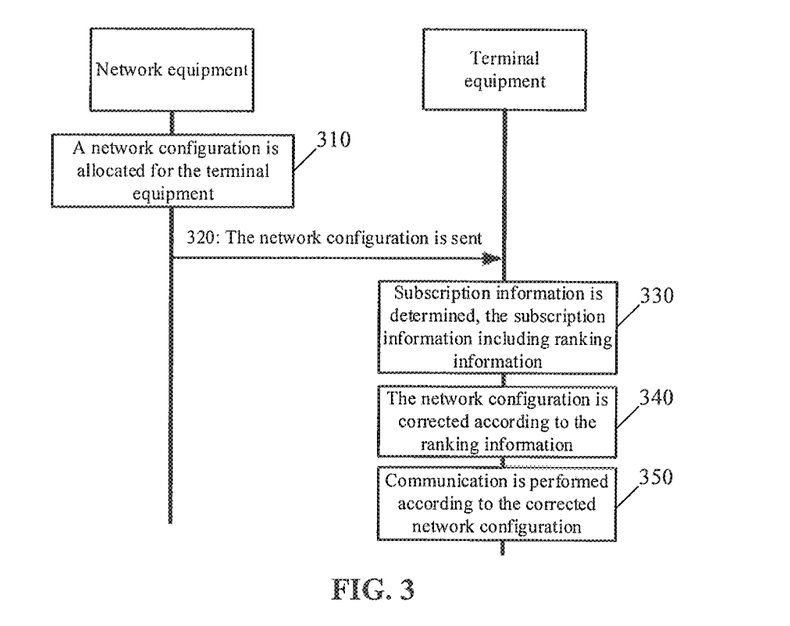
FIG. 3 is a schematic flowchart of a communication method according to another embodiment of the application.

FIG. 3 is a flowchart of a communication method according to another embodiment of the application. It is to be noted that this is not intended to limit the scope of the embodiment of the application but only to help those skilled in the art to better understand the embodiment of the application.

In 310, network equipment determines a network configuration.

The network equipment may allocate the network configuration for terminal equipment according to QoS of a service initiated by the terminal equipment, a wireless channel condition of the terminal equipment, a load condition of a network, other information or the like, which will not be limited in the embodiment of the application.

In an example, the network configuration includes at least one of a physical configuration, a MAC configuration, an RLC configuration, a PDCP configuration or a time-frequency resource configuration.

The network configuration may include one configuration information in layer-1 (physical layer) or layer-2 (MAC layer, RLC layer and PDCP layer) configuration information or the time-frequency resource configuration. Alternatively, the network equipment may simultaneously determine a layer-1 configuration, a layer-2 configuration, the time-frequency resource configuration or the like. There are no limits made in the application.

Herein, layer 1 includes a physical process of coding, modulation, multi-antenna mapping or the like and is configured to provide a transmission channel for the MAC layer. Layer 2 includes hybrid automatic repeat request, uplink and downlink scheduling or the like and is configured to provide a logical channel for the RLC layer.

It is to be noted that the network configuration may also be a location configuration of a physical time-frequency resource block, a modulation and coding configuration, a reference signal configuration, an antenna configuration, a transmission bandwidth or the like, which will not be listed herein one by one. There are no limits made in the application.

In 320, the network equipment sends the network configuration to terminal equipment.

In an example, the operation that the terminal equipment receives the network configuration sent by the network equipment includes that the terminal equipment receives the network configuration sent by the network equipment through a broadcast or dedicated high-layer signaling.

In the embodiment of the application, the network equipment may send the network configuration to the terminal equipment through a system information broadcast. Alternatively, the network equipment may send the network configuration to the terminal equipment through control signaling. The control signaling may be physical control signaling, for example, a PDCCH. Alternatively, the network equipment may further send the network configuration to the terminal equipment through the dedicated high-layer signaling. There are no limits made in the application.

In 330, the terminal equipment determines subscription information, the subscription information including ranking information of the terminal equipment.

In an example, the ranking information is configured to indicate that the terminal equipment is first-priority terminal equipment, second-priority terminal equipment or third-priority terminal equipment. The first-priority terminal equipment, the second-priority terminal equipment and the third-priority terminal equipment have gradually-decreased parameter requirements on the network configuration.

The ranking information of the terminal equipment may be configured to indicate that the terminal equipment is terminal equipment of gold, silver and copper rankings; or the ranking information is configured to indicate that the terminal equipment is high-priority, medium-priority and low-priority terminal equipment, the specific number of rankings into which the terminal equipment may be divided or the like. There are no limits made in the application.

In 340, the terminal equipment corrects the network configuration according to the ranking information.

The terminal equipment corrects a parameter of the network configuration by offsetting, scaling or another operation according to the ranking information and preferentially operates towards a direction favorable for the high-priority terminal equipment, thereby improving a user experience of the high-priority terminal equipment.

In an example, the terminal equipment determines a correction value according to the ranking information, the correction value being configured to indicate a correction amplitude of the network configuration, and corrects the network configuration according to the correction value.

The correction value or correction amplitude of the terminal equipment may be configured through the network equipment, for example, configured through high-layer signaling (Non-Access Stratum (NAS) signaling or RRC signaling or MAC signaling or the like), or is predefined in a protocol, or is obtained by the terminal through subscription information, or is determined by the terminal.

For example, a correction value configured for the first-priority terminal equipment by the network equipment is A, a correction value configured for the second-priority terminal equipment is 0 and a correction value configured for the third-priority terminal equipment is −A. Then, when the terminal equipment determines that the terminal equipment is the first-priority terminal equipment according to the ranking information, it may be determined that the corresponding correction value is A. If the ranking information indicates that the terminal equipment is the second-priority terminal equipment, the correction value corresponding to the second-priority terminal equipment is 0. If the ranking information indicates that the terminal equipment is the third-priority terminal equipment, the correction value corresponding to the third-priority terminal equipment is −A.

In an example, the network configuration is a residence rate or access rate of a first percentage, the residence rate is a probability of residence of the terminal equipment in a present network in case of network congestion and the access rate is a probability of accessing the terminal equipment to the network equipment. The operation that the terminal equipment corrects the network configuration according to the ranking information includes that: if the ranking information indicates that the terminal equipment is the first-priority terminal equipment, the first-priority terminal equipment amplifies the residence rate or the access rate into a second percentage, the second percentage being higher than the first percentage.

In the embodiment of the application, descriptions are made with the condition that the ranking information of the terminal equipment indicates that the terminal equipment has three priorities and namely is the first-priority terminal equipment, the second-priority terminal equipment and the third-priority terminal equipment as an example. However, the application is not limited.

Specifically, if the ranking information of the terminal equipment indicates that the terminal equipment is the first-priority terminal equipment, when the number of residing users is limited in case of network congestion, the first-priority terminal equipment may scale a residence probability of the network configuration, thereby improving the probability of residence in the network.

During access control of the network equipment, the first-priority terminal equipment may scale the access probability of the network configuration, thereby improving the probability of accessing the first-priority terminal equipment to the network.

For example, a probability, configured for the terminal equipment by the network equipment through broadcast information, of access to an Adaptive Multi-Rate (AMR) 12.2 kbps voice service is 60%. If the ranking information of the terminal equipment indicates that the terminal equipment is the first-priority terminal equipment, the first-priority terminal equipment may scale the probability, namely increasing the access probability to 80%.

It is to be understood that the first-priority terminal equipment, when amplifying the residence rate or the access rate, may amplify it to 100%. That is, the first-priority terminal equipment may ignore the residence rate or the access rate and is not limited by the network configuration, which will not be limited in the disclosure. In an example, the network configuration is a service of a first rate. The operation that the terminal equipment corrects the network configuration according to the ranking information includes that: if the ranking information indicates that the terminal equipment is the first-priority terminal equipment, the first-priority terminal equipment offsets the first rate into a second rate, the second rate being higher than the first rate.

It is to be understood that the service may be a voice service or a video service, an image service, a call service or the like, which will not be limited in the application. When the network limits services which may be initiated by the terminal equipment through the broadcast information, the first-priority terminal equipment may add an offset based on the network configuration, thereby achieving a better service experience for the first-priority terminal equipment.

For example, a rate, configured for the terminal equipment by the network equipment through the broadcast information, of a voice service which may be initiated is AMR 12.2 kbps. If the ranking information of the terminal equipment indicates that the terminal equipment is the first-priority terminal equipment, the first-priority terminal equipment may add a rate offset, that is, the first-priority terminal equipment may adopt an AMR 19.23 kbps for the voice service.

For another example, a rate, configured for the terminal equipment by the network equipment through the broadcast information, of a voice service which may be initiated when the channel condition is that Reference Signal Receiving Power (RSRP) is not lower than −90 dBm is AMR 12.2 kbps. If the ranking information of the terminal equipment indicates that the terminal equipment is the first-priority terminal equipment, the first-priority terminal equipment may add an RSRP value offset, that is, the first-priority terminal equipment may initiate the voice rate of the AMR 12.2 kbps rate when the channel condition is not lower than −100 dBm.

It is to be noted that adding, by the first-priority terminal equipment, the offset based on the network configuration in the application may be applied to a specific channel condition, or a network congestion condition, or another application scenario or the like, which will not be limited in the disclosure.

It is also to be understood that the first-priority terminal equipment, when performing offset correction on the service rate, may offset it to any rate value. That is, the first-priority terminal equipment may ignore the rate value and may support a service of any rate value.

In an example, when the network equipment relocates or reorients the first-priority terminal equipment to another network or frequency point, the first-priority terminal equipment may reside at a habitual frequency point or habitual network recorded previously. Meanwhile, the first-priority terminal equipment sends a notification message to the network equipment to notify this choice of the first-priority terminal equipment to enable the network equipment to allocate a network configuration of the habitual frequency point or the habitual network for the terminal equipment.

If the ranking information of the terminal equipment indicates that the terminal equipment is the third-priority terminal equipment, under the condition that there is a sufficient network configuration after the other terminal equipment higher than the third-priority terminal equipment corrects the network configuration parameter, the third-priority terminal equipment corrects the network configuration parameter towards a direction favorable for itself by scaling or offsetting. However, if there is no left network configuration, the third-priority terminal equipment may correct it towards a direction unfavorable for it. For example, the third-priority terminal equipment performs correction in a manner opposite to the first-priority terminal equipment, and a specific operation method will not be elaborated herein.

In 350, the terminal equipment communicates with the network equipment according to the corrected network configuration.

The terminal equipment performs communication with the network equipment according to the corrected network configuration. The network equipment may provide differentiated network configurations for different terminal equipment, so that QoS enjoyed by high-ranking terminal equipment is improved.

Therefore, according to the communication method of the embodiment of the application, the terminal equipment corrects the network configuration received from the network equipment according to the ranking information in the subscription information and communicates with the network equipment according to the corrected network configuration. In such a manner, different terminal equipment may obtain differentiated network configurations. Therefore, the QoS enjoyed by the high-ranking terminal equipment is improved.

It is to be understood that, in various embodiments of the application, a sequence number of each process does not mean an execution sequence and the execution sequence of each process should be determined by its function and an internal logic and should not form any limit to an implementation process of the embodiments of the application.

The communication method according to the embodiments of the application is described above in detail, and network equipment and terminal equipment according to the embodiments of the application will be described below.

Figure 4:
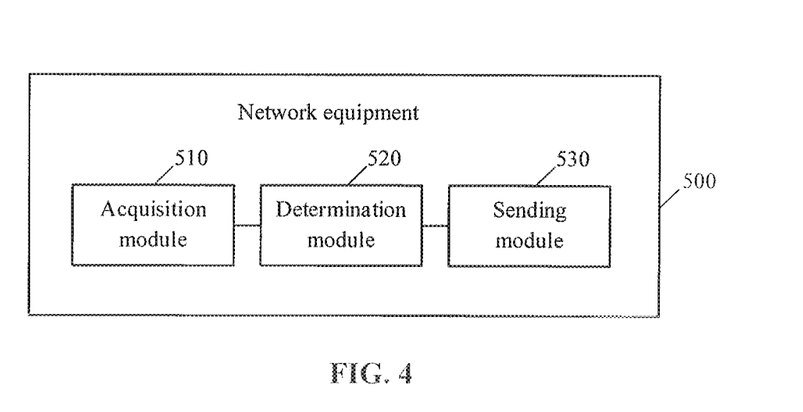
FIG. 4 is a schematic block diagram of network equipment according to an embodiment of the application.

FIG. 4 is a schematic block diagram of network equipment 500 according to an embodiment of the application. As shown in FIG. 4, the network equipment 500 includes an acquisition module 510, a processing module 520 and a sending module 530.

The acquisition module 510 is configured to acquire subscription information of terminal equipment, the subscription information including ranking information of the terminal equipment.

The processing module 520 is configured to allocate a first network configuration for the terminal equipment according to the ranking information acquired by the acquisition module.

The sending module 530 is configured to send the first network configuration allocated by the processing module to the terminal equipment to enable the terminal equipment to communicate with the network equipment according to the first network configuration.

Therefore, according to the network equipment in the embodiment of the application, the subscription information including the ranking information of the terminal equipment is acquired, and the network configuration is determined for the terminal equipment. In such a manner, the network equipment may provide differentiated network configurations for different terminal equipment. Therefore, QoS provided for high-ranking terminal equipment is improved.

In an example, the acquisition module 510 is specifically configured to acquire the subscription information from core network equipment or the terminal equipment.

In the application, in an example, the network configuration includes at least one of a physical configuration, a MAC configuration, an RLC configuration, a PDCP configuration or a time-frequency resource configuration.

In an example, the ranking information is configured to indicate that the terminal equipment is first-priority terminal equipment, second-priority terminal equipment or third-priority terminal equipment. The first-priority terminal equipment, the second-priority terminal equipment and the third-priority terminal equipment have gradually-decreased priorities.

In an example, the processing module 520 is specifically configured to, if the ranking information indicates that the terminal equipment is the first-priority terminal equipment, preferentially allocate the first network configuration for the first-priority terminal equipment.

In an example, the processing module 520 is specifically configured to, if the ranking information indicates that the terminal equipment is the first-priority terminal equipment, determine a second network configuration, the second network configuration being a network configuration with a highest utilization rate in all network configurations allocated for the first-priority terminal equipment by the network equipment; and preferentially allocate the second network configuration for the first-priority terminal equipment.

Therefore, according to the network equipment in the embodiment of the application, the network equipment acquires the subscription information including the ranking information of the terminal equipment and allocates the network configuration for the terminal equipment. In such a manner, the network equipment may provide differentiated network configurations for different terminal equipment. Therefore, the QoS provided for the high-ranking terminal equipment is improved.

The network equipment 500 according to the embodiment of the application may correspond to network equipment in the communication method according to the embodiment of the disclosure and the abovementioned and other operations and/or functions of each module in the network equipment 500 are adopted to implement the corresponding flows of each method respectively and will not be elaborated herein for simplicity.

Figure 5:
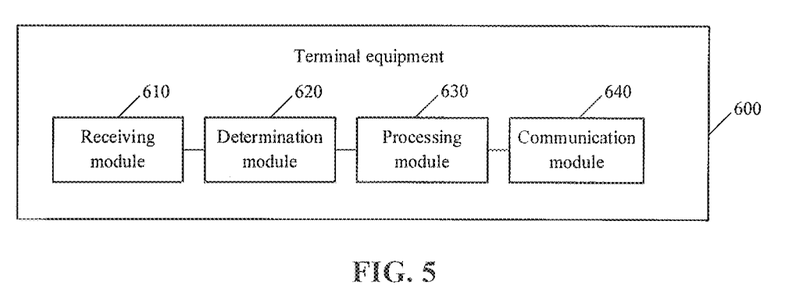
FIG. 5 is a schematic block diagram of terminal equipment according to an embodiment of the application.

FIG. 5 is a schematic block diagram of terminal equipment 600 according to an embodiment of the application. As shown in FIG. 5, the terminal equipment 600 includes a receiving module 610, a determination module 620, a processing module 630 and a communication module 640.

The receiving module 610 is configured to receive a network configuration sent by network equipment.

The determination module 620 is configured to determine subscription information, the subscription information including ranking information of the terminal equipment.

The processing module 630 is configured to correct the network configuration received by the receiving module according to the ranking information determined by the determination module.

The communication module 640 is configured to communicate with the network equipment according to the network configuration corrected by the processing module.

Therefore, according to the terminal equipment in the embodiment of the application, the network configuration received from the network equipment is corrected according to the ranking information in the subscription information, and communication is performed with the network equipment according to the corrected network configuration. In such a manner, different terminal equipment may obtain differentiated network configurations. Therefore, QoS provided for high-ranking terminal equipment is improved.

In the application, in an example, the network configuration includes at least one of a physical configuration, a MAC configuration, an RLC configuration, a PDCP configuration or a time-frequency resource configuration.

In an example, the ranking information is configured to indicate that the terminal equipment is first-priority terminal equipment, second-priority terminal equipment or third-priority terminal equipment. The first-priority terminal equipment, the second-priority terminal equipment and the third-priority terminal equipment have gradually-decreased parameter requirements on the network configuration.

In an example, the receiving module 610 is specifically configured to receive the network configuration sent by the network equipment through a broadcast or dedicated high-layer signaling.

In an example, the network configuration is a service of a first rate. The processing module 630 is specifically configured to, if the ranking information indicates that the terminal equipment is the first-priority terminal equipment, offset, by the first-priority terminal equipment, the first rate into a second rate, the second rate being higher than the first rate.

In an example, the network configuration is a residence rate or access rate of a first percentage, the residence rate is a probability of residence of the terminal equipment in a present network in case of network congestion and the access rate is a probability of accessing the terminal equipment to the network equipment.

The processing module 630 is specifically configured to, if the ranking information indicates that the terminal equipment is the first-priority terminal equipment, amplify, by the first-priority terminal equipment, the residence rate or the access rate into a second percentage, the second percentage being higher than the first percentage.

Therefore, according to the terminal equipment in the embodiment of the application, the network configuration received from the network equipment is corrected according to the ranking information in the subscription information, and communication is performed with the network equipment according to the corrected network configuration. In such a manner, different terminal equipment may obtain differentiated network configurations. Therefore, the QoS provided for the high-ranking terminal equipment is improved.

The terminal equipment 600 according to the embodiment of the application may correspond to terminal equipment in the communication method according to the embodiment of the disclosure and the abovementioned and other operations and/or functions of each module in the terminal equipment 600 are adopted to implement the corresponding flows of each method respectively and will not be elaborated herein for simplicity.

Figure 6:
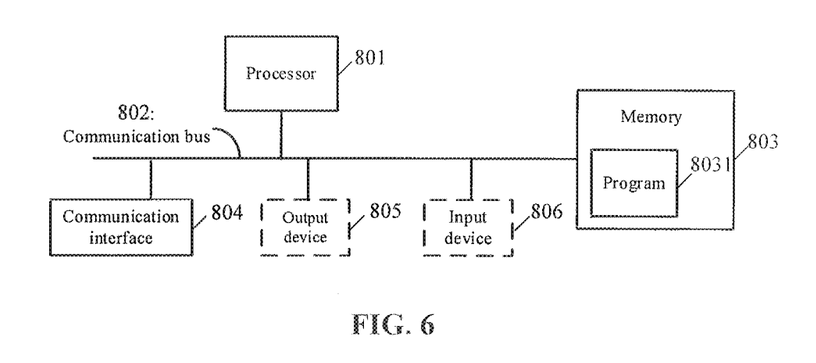
FIG. 6 is a structure diagram of network equipment according to an embodiment of the application.

FIG. 6 is a structure diagram of network equipment according to an embodiment of the application. The network equipment includes at least one processor 801, a communication bus 802, a memory 803 and at least one communication interface 804.

The processor 801 may be a Central Processing Unit (CPU), a microprocessor, an Application-Specific Integrated Circuit (ASIC) or one or more integrated circuits configured to control a solution program of the disclosure to be executed.

The communication bus 802 may include a path transmitting information between the components. The communication interface 804 uses any device such as a transceiver and is configured for communication with other equipment or communication network, for example, the Ethernet, a RAN and a WLAN.

The memory 803 may be a Read-Only Memory (ROM) or another type of static storage equipment capable of storing static information and instructions and a Random Access Memory (RAM) or another type of dynamic storage equipment capable of storing information and instructions, and may also be, but not limited to, an Electrically Erasable Programmable Read-Only Memory (EEPROM), a Compact Disc Read-Only Memory (CD-ROM) or another optical disk storage, an optical disc storage (including a compact disc, a laser disc, an optical disc, a digital universal disc, a blue-ray disc or the like), a disk storage medium or other magnetic storage equipment, or any other medium configurable to contain or store an expected program code in an instruction or data structure form and accessible for a computer. The memory may independently exist and is connected with the processor through the bus. The memory may also be integrated with the processor.

During specific implementation, as an embodiment, the network equipment may further include output device 805 and input device 806. The output device 805 communicates with the processor 801 and displays information in various manners. For example, the output device 805 may be a Liquid Crystal Display (LCD), Light Emitting Diode (LED) display equipment, Cathode Ray Tube (CRT) display equipment, a projector or the like. The input device 806 communicates with the processor 801 and receives input of a user in various manners. For example, the input device 806 may be a mouse, a keyboard, touch screen equipment, sensing equipment or the like.

Herein, the memory 803 is configured to store at least one application program code for executing the solutions of the disclosure, and execution is controlled by the processor 801. The processor 801 is configured to execute an application program 8031 stored in the memory 803 to execute the following operations of: acquiring subscription information of terminal equipment through the input device 806, the subscription information including ranking information of the terminal equipment; allocating a first network configuration for the terminal equipment according to the ranking information; and sending the first network configuration to the terminal equipment through the output device 805 to enable the terminal equipment to perform communication with the network equipment according to the first network configuration.

In an example, the processor 801 is specifically configured to acquire the subscription information from core network equipment or the terminal equipment through the input device 806.

In an example, the network configuration includes at least one of a physical configuration, a MAC configuration, an RLC configuration, a PDCP configuration or a time-frequency resource configuration.

In an example, the ranking information is configured to indicate that the terminal equipment is first-priority terminal equipment, second-priority terminal equipment or third-priority terminal equipment. The first-priority terminal equipment, the second-priority terminal equipment and the third-priority terminal equipment have gradually-decreased priorities.

In an example, the processor 801 is specifically configured to, if the ranking information indicates that the terminal equipment is the first-priority terminal equipment, preferentially allocate the first network configuration for the first-priority terminal equipment.

In an example, the processor 801 is specifically configured to, if the ranking information indicates that the terminal equipment is the first-priority terminal equipment, determine a second network configuration, the second network configuration being a network configuration with a highest utilization rate in all network configurations allocated for the first-priority terminal equipment by the network equipment and the network equipment recording all the network configurations allocated for the first-priority terminal equipment; and preferentially allocate the second network configuration for the first-priority terminal equipment.

As can be seen from the above technical solution provided by the embodiment of the application, the subscription information including the ranking information of the terminal equipment is acquired, and the network configuration is allocated for the terminal equipment according to the ranking information. In such a manner, the network equipment may provide differentiated network configurations for different terminal equipment, so that QoS provided for high-ranking terminal equipment is improved.

The network equipment 800 according to the embodiment of the application may correspond to network equipment in the communication method according to the embodiment of the disclosure and the abovementioned and other operations and/or functions of each module in the network equipment 800 are adopted to implement the corresponding flows of each method respectively and will not be elaborated herein for simplicity.

Figure 7:
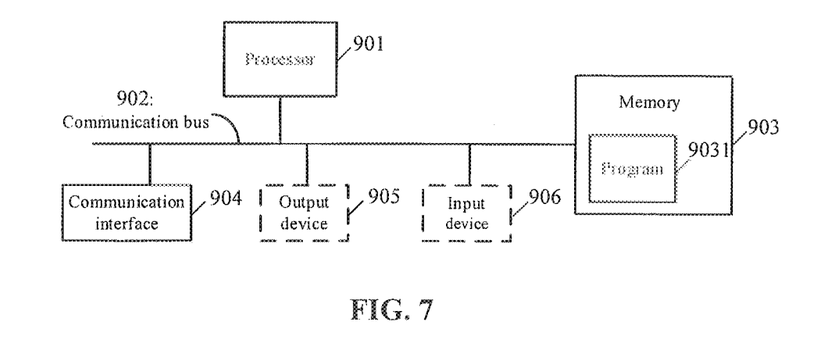
FIG. 7 is a structure diagram of terminal equipment according to an embodiment of the application.

FIG. 7 is a structure diagram of terminal equipment according to an embodiment of the application. The terminal equipment includes at least one processor 901, a communication bus 902, a memory 903 and at least one communication interface 904.

The processor 901 may be a CPU, a microprocessor, an ASIC or one or more integrated circuits configured to control a solution program of the disclosure to be executed.

The communication bus 902 may include a path transmitting information between the components. The communication interface 904 uses any device such as a transceiver and is configured for communication with other equipment or communication network, for example, the Ethernet, a RAN and a WLAN.

The memory 903 may be a ROM or another type of static storage equipment capable of storing static information and instructions and a RAM or another type of dynamic storage equipment capable of storing information and instructions, and may also be, but not limited to, an EEPROM, a CD-ROM or another optical disk storage, an optical disc storage (including a compact disc, a laser disc, an optical disc, a digital universal disc, a blue-ray disc or the like), a disk storage medium or other magnetic storage equipment, or any other medium configurable to contain or store an expected program code in an instruction or data structure form and accessible for a computer. The memory may independently exist and is connected with the processor through the bus. The memory may also be integrated with the processor.

During specific implementation, as an embodiment, the network equipment may further include output device 905 and input device 906. The output device 905 communicates with the processor 901 and displays information in various manners. For example, the output device 905 may be an LCD, LED display equipment, CRT display equipment, a projector or the like. The input device 906 communicates with the processor 901 and receives input of a user in various manners. For example, the input device 906 may be a mouse, a keyboard, touch screen equipment, sensing equipment or the like.

Herein, the memory 903 is configured to store an application program code executing the solutions of the disclosure, and execution is controlled by the processor 901. The processor 901 is configured to execute an application program 9031 stored in the memory 903 to execute the following operations of: receiving a network configuration sent by network equipment through the input device 906; determining subscription information, the subscription information including ranking information of the terminal equipment; correcting the network configuration according to the ranking information; and performing communication with the network equipment according to the corrected network configuration through the communication interface 904.

In an example, the network configuration includes at least one of a physical configuration, a MAC configuration, an RLC configuration, a PDCP configuration or a time-frequency resource configuration.

In an example, the ranking information is configured to indicate that the terminal equipment is first-priority terminal equipment, second-priority terminal equipment or third-priority terminal equipment. The first-priority terminal equipment, the second-priority terminal equipment and the third-priority terminal equipment have gradually-decreased parameter requirements on the network configuration.

In an example, the processor 904 is specifically configured to receive the network configuration sent by the network equipment through a broadcast or dedicated high-layer signaling through the input device 906.

In an example, the network configuration is a service of a first rate. The processor 904 is specifically configured to, if the ranking information indicates that the terminal equipment is the first-priority terminal equipment, offset, by the first-priority terminal equipment, the first rate into a second rate, the second rate being higher than the first rate.

In an example, the network configuration is a residence rate or access rate of a first percentage, the residence rate is a probability of residence of the terminal equipment in a present network in case of network congestion and the access rate is an access probability of accessing the terminal equipment to the network equipment. The processor 904 is specifically configured to, if the ranking information indicates that the terminal equipment is the first-priority terminal equipment, amplify, by the first-priority terminal equipment, the residence rate or the access rate into a second percentage, the second percentage being higher than the first percentage.

As can be seen from the above technical solution provided by the embodiment of the application, the terminal equipment corrects the network configuration received from the network equipment according to the ranking information in the subscription information and performs communication with the network equipment according to the corrected network configuration. In such a manner, different terminal equipment may obtain differentiated network configurations, so that QoS enjoyed by high-ranking terminal equipment is improved.

The terminal equipment 900 according to the embodiment of the application may correspond to terminal equipment in the communication method according to the embodiment of the disclosure. The abovementioned and other operations and/or functions of each module in the terminal equipment 900 are adopted to implement the corresponding flows of each method respectively and will not be elaborated herein for simplicity.

An embodiment of the application further provides a computer storage medium, which may store program instruction(s) configured to indicate any abovementioned method.

In an example, the storage medium may specifically be the memory 803 or 903.

It is to be understood that the term "and/or" in the disclosure is only an association relationship describing associated objects and represents that three relationships may exist. For example, A and/or B may represent three conditions, i.e., independent existence of A, existence of both A and B and independent existence of B. In addition, character "/" in the disclosure usually represents that previous and next associated objects form an "or" relationship.

It is to be understood that, in various embodiments of the disclosure, a sequence number of each process does not mean an execution sequence and the execution sequence of each process should be determined by its function and an internal logic and should not form any limit to an implementation process of the embodiments of the disclosure.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the application may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the steps of the method in each embodiment of the application. The abovementioned storage medium includes: various media capable of storing program codes such as a U disk, a mobile hard disk, a ROM, a RAM, a magnetic disk or an optical disk.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. A communication method, comprising:
  receiving, by terminal equipment, a network configuration sent by network equipment;
  determining, by the terminal equipment, subscription information, the subscription information comprising ranking information of the terminal equipment;
  correcting, by the terminal equipment, the network configuration according to the ranking information; and
  communicating, by the terminal equipment, with the network equipment according to the corrected network configuration;
  wherein the ranking information is configured to indicate that the terminal equipment is first-priority terminal equipment, second-priority terminal equipment or third-priority terminal equipment, and wherein the first-priority terminal equipment, the second-priority terminal equipment and the third-priority terminal equipment have gradually-decreased parameter requirements on the first network configuration, and a network configuration is preferentially allocated to the first-priority terminal equipment;
  wherein the network configuration comprises the first network configuration or a second network configuration, and the second network configuration is a network configuration with a highest utilization rate in all network configurations allocated for the first- priority terminal equipment by the network equipment,
  wherein the network configuration is a residence rate or access rate of a first percentage, the residence rate is a probability of residence of the terminal equipment in a network in case of network congestion and the access rate is a probability of accessing the terminal equipment to the network equipment,
  wherein correcting, by the terminal equipment, the network configuration according to the ranking information comprises:
  if the ranking information indicates that the terminal equipment is the first-priority terminal equipment, amplifying, by the first-priority terminal equipment, the residence rate or the access rate into a second percentage, the second percentage being higher than the first percentage.

2. The communication method according to claim 1, wherein the network configuration comprises at least one of a physical configuration, a Media Access Control (MAC) configuration, a Radio Link Control (RLC) configuration, a Packet Data Convergence Protocol (PDCP) configuration or a time-frequency resource configuration.

3. The method according to claim 1, wherein receiving, by the terminal equipment, the network configuration sent by the network equipment comprises:
  receiving, by the terminal equipment, the network configuration sent by the network equipment through a broadcast or dedicated high-layer signaling.

4. The communication method according to claim 1, wherein the network configuration is a service of a first rate,
  wherein correcting, by the terminal equipment, the network configuration according to the ranking information comprises:
  if the ranking information indicates that the terminal equipment is the first-priority terminal equipment, offsetting, by the first-priority terminal equipment, the first rate into a second rate, the second rate being higher than the first rate.

5. Terminal equipment, comprising:
  a memory configured to store at least one instruction; and
  a processor configured to execute at least one instruction
    to receive a network configuration sent by network equipment;
    determine subscription information, the subscription information comprising ranking information of the terminal equipment;
    correct the network configuration received by the receiving module according to the ranking information determined by the determination module; and
    communicate with the network equipment according to the network configuration corrected by the processing module;
  wherein the ranking information is configured to indicate that the terminal equipment is first-priority terminal equipment, second-priority terminal equipment or third-priority terminal equipment, and wherein the first-priority terminal equipment, the second-priority terminal equipment and the third-priority terminal equipment have gradually-decreased parameter requirements on the first network configuration, and a network configuration is preferentially allocated to the first-priority terminal equipment;
  wherein the network configuration comprises the first network configuration or a second network configuration, and the second network configuration is a network configuration with a highest utilization rate in all network configurations allocated for the first-priority terminal equipment by the network equipment,
  wherein the network configuration is a residence rate or access rate of a first percentage, the residence rate is a probability of residence of the terminal equipment in a network in case of network congestion and the access rate is a probability of accessing the terminal equipment to the network equipment,
  wherein correcting, by the terminal equipment, the network configuration according to the ranking information comprises:
  if the ranking information indicates that the terminal equipment is the first-priority terminal equipment, amplifying, by the first-priority terminal equipment, the residence rate or the access rate into a second percentage, the second percentage being higher than the first percentage.

6. The terminal equipment according to claim 5, wherein the network configuration comprises at least one of a physical configuration, a Media Access Control (MAC) configuration, a Radio Link Control (RLC) configuration, a Packet Data Convergence Protocol (PDCP) configuration or a time-frequency resource configuration.

7. The terminal equipment according to claim 5, wherein the processor is specifically configured to:
receive the network configuration sent by the network equipment through a broadcast or dedicated high-layer signaling.

8. The terminal equipment according to claim 5, wherein the network configuration is a service of a first rate,
wherein the processor is specifically configured to:
if the ranking information indicates that the terminal equipment is the first-priority terminal equipment, offset the first rate into a second rate, the second rate being higher than the first rate.

9. The terminal equipment according to claim 5, wherein the network configuration is a residence rate or access rate of a first percentage, the residence rate is a probability of residence of the terminal equipment in a present network in case of network congestion and the access rate is a probability of accessing the terminal equipment to the network equipment,
wherein the processor is specifically configured to:
if the ranking information indicates that the terminal equipment is the first-priority terminal equipment, amplify the residence rate or the access rate into a second percentage, the second percentage being higher than the first percentage.

10. The communication method according to claim 1, wherein the second network configuration is preferentially allocated to the first-priority terminal equipment if the ranking information indicates that the terminal equipment is the first-priority terminal equipment.

11. The terminal equipment according to claim 5, wherein the second network configuration is preferentially allocated to the first-priority terminal equipment, if the ranking information indicates that the terminal equipment is the first-priority terminal equipment.

* * * * *